United States Patent
McKibben

(10) Patent No.: US 11,871,303 B2
(45) Date of Patent: Jan. 9, 2024

(54) METHOD AND SYSTEM OF SUPPORTING CONTINUOUS ACCESS TO CONTENT TRANSMITTED OVER TWO OR MORE NETWORKS

(71) Applicant: Cable Television Laboratories, Inc., Louisville, CO (US)

(72) Inventor: Bernie McKibben, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 347 days.

(21) Appl. No.: 15/276,786

(22) Filed: Sep. 26, 2016

(65) Prior Publication Data
US 2017/0238224 A1   Aug. 17, 2017

Related U.S. Application Data

(63) Continuation of application No. 12/178,755, filed on Jul. 24, 2008, now Pat. No. 9,456,326.

(51) Int. Cl.
| | |
|---|---|
| *H04W 36/18* | (2009.01) |
| *H04W 12/06* | (2021.01) |
| *H04W 4/06* | (2009.01) |
| *H04W 12/062* | (2021.01) |

(52) U.S. Cl.
CPC .......... *H04W 4/06* (2013.01); *H04W 12/062* (2021.01); *H04W 36/18* (2013.01)

(58) Field of Classification Search
CPC ........ H04W 36/18; H04W 12/06; H04W 4/06
See application file for complete search history.

(56) References Cited

U.S. PATENT DOCUMENTS

| | | | |
|---|---|---|---|
| 7,296,091 B1 * | 11/2007 | Dutta ..................... | H04H 20/42 370/331 |
| 8,532,653 B2 * | 9/2013 | Zisimopoulos ....... | H04W 76/40 455/435.1 |
| 9,456,326 B2 | 9/2016 | McKibben | |
| 2003/0021286 A1 * | 1/2003 | Boscovic ............... | H04H 20/24 370/431 |
| 2003/0200499 A1 * | 10/2003 | Khayrallah ........... | H04L 1/0009 714/776 |
| 2004/0047311 A1 | 3/2004 | Pekonen | |
| 2004/0258016 A1 * | 12/2004 | Schmidt .............. | H04M 1/2535 370/329 |
| 2005/0021833 A1 * | 1/2005 | Hundscheid ........ | H04L 12/1827 709/236 |
| 2005/0177851 A1 * | 8/2005 | Murao ................... | H04H 20/06 348/E7.071 |
| 2007/0064652 A1 | 3/2007 | Xu et al. | |
| 2007/0076716 A1 * | 4/2007 | Jang ..................... | H04N 21/235 370/390 |
| 2008/0162637 A1 | 7/2008 | Adamczyk et al. | |
| 2009/0047968 A1 | 2/2009 | Gunnarsson et al. | |

(Continued)

*Primary Examiner* — Muthuswamy G Manoharan
(74) *Attorney, Agent, or Firm* — Josh C. Snider

(57) ABSTRACT

A system and method of supporting access to content over first and second networks that allows a user to access content over different networks, either on the same device or with different devices. The access may be supported in a continuous or seamless matter without substantially interrupting access to the content, such as by instigating the transition during a period of time when minimal, if any content, or content of value, is likely to be missed.

12 Claims, 2 Drawing Sheets

(56) References Cited

U.S. PATENT DOCUMENTS

| | | | |
|---|---|---|---|
| 2009/0185522 A1* | 7/2009 | Periyalwar | H04W 48/18 370/328 |
| 2009/0262679 A1* | 10/2009 | Kim | H04H 20/26 370/328 |
| 2010/0128649 A1* | 5/2010 | Gonsa | H04W 72/005 370/312 |

* cited by examiner

METHOD AND SYSTEM OF SUPPORTING CONTINUOUS ACCESS TO CONTENT TRANSMITTED OVER TWO OR MORE NETWORKS

The present Application is a continuation of U.S. application Ser. No. 12/178,755, filed Jul. 24, 2008, now U.S. Pat. No. 9,456,326, issued Sep. 27, 2016.

BACKGROUND OF THE INVENTION

1. Technical Field

The present invention relates to methods and systems that facilitate continuous access to content over a first network and a second network.

2. Background

In the past, content providers supplied their customers with a device to process signals according to transmission requirements of a network used by the provider to deliver services. These types of devices were typically bound to the network of the associated provider and would not function with other provider networks. As technology has emerged and become more proficient, similar types of devices are now sophisticated enough to facilitate communications over multiple networks, regardless of the transmission characteristics of the networks.

The same device can now be used to access content carried over different provider networks. If a user has a mobile phone, for example, the mobile phone may include capabilities that allow it to access content carried over a cable television network and a mobile phone network. While the mobile phone may support access to both of the cable television and mobile phone networks, the providers associated with each network may not communicate. This lack of communication may make it difficult for a user to transition between the networks without an interruption in service.

If the user is watching a television program carried on a particular television channel of the cable television network and decides to leave their access area, the user must locate the television program on the mobile phone network before they can re-join an already in-progress television program. Because the providers lack sufficient communication, the mobile device is unable to locate the television program on the other network without some assistance from the user. This can lead to a problematic interruption in service while the user searches the other network for the desired television program.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
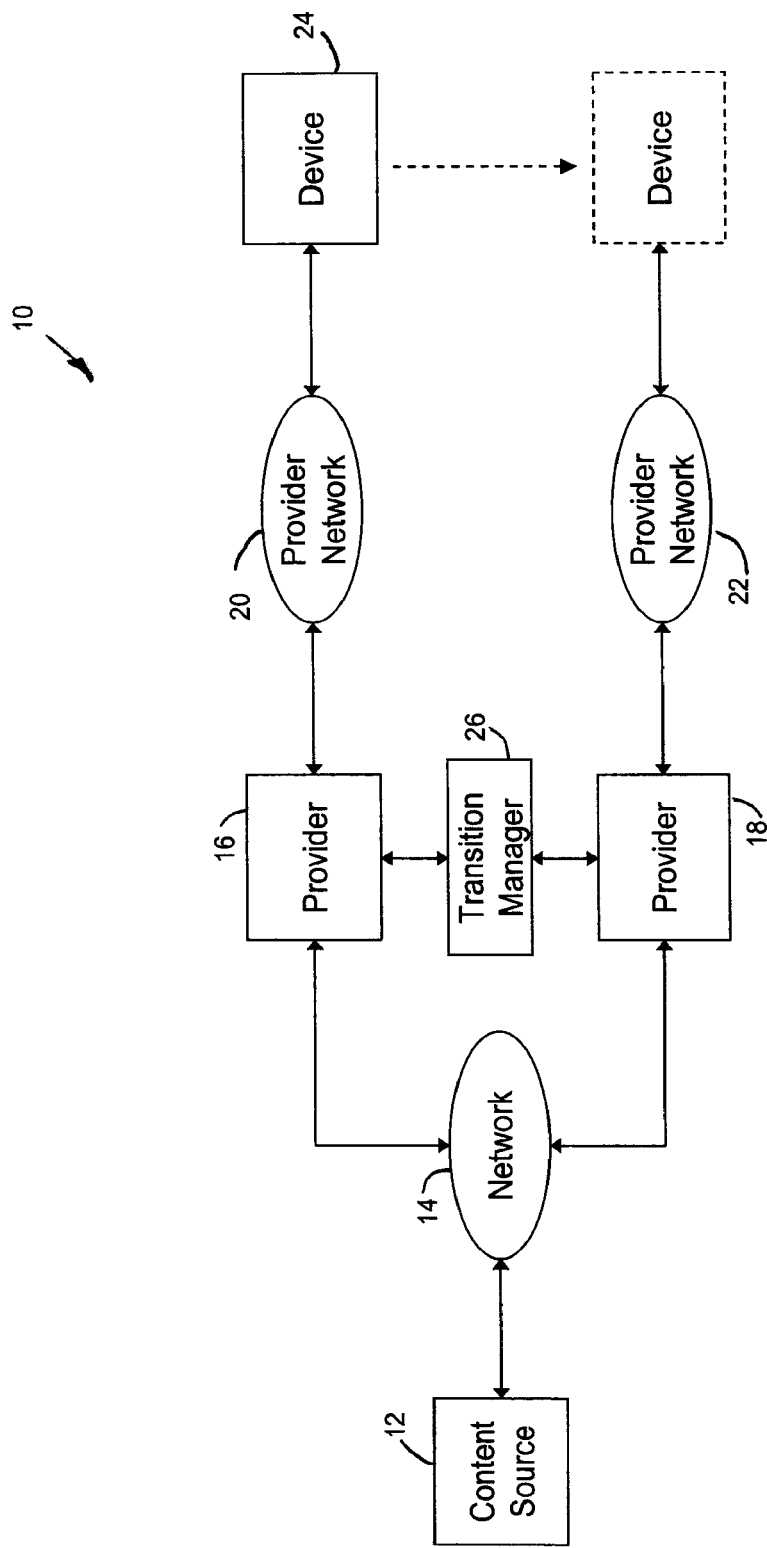
FIG. 1 illustrates a system that supports continuous access to content in accordance with one non-limiting aspect of the present invention.

FIG. 1 illustrates a system 10 that supports continuous access to content in accordance with one non-limiting aspect of the present invention. The system 10 may include a content source 12 for providing content. The content source 12 may be an originator of content, such as but not limited to a television or movie studio that, in some cases, delivers clear content over a wireless or wireline network 14 to a number of service providers 16, 18. The service providers 16, 18 may be multiple system operators (MSOs) or other entities that package content from the content source 12 into one or more services, such as but not limit to cable, broadcast and satellite television providers, telecommunications providers, and internet service providers.

The service providers 16, 18 may package the content into their other offered services for transmission to any number of subscribers. Depending on configurations of networks 20, 22 used to transmit the related signals, the providers 16, 18 may scramble, encrypt, address, and perform any number of operations to support content transmission. The signal manipulation and transmission may vary from network 20 to network 72. In one non-limiting and exemplary aspect of the present invention, the networks 20, 22 may rely on different codecs to support signal transmission. While the present invention applies to any phone, television, or data system that transmits signals, another non-limiting and exemplary aspect of the present invention contemplates the networks 20, 22 supporting television program transmission over broadcast and multicast tiers.

The broadcast tier may support broadcast of a number of television channels to an indiscriminate number of subscribers. In this arrangement, a channel is typically dedicated to each content source 12 (only one is shown in FIG. 1) and always carried on that channel until the tier is re-constructed, which is infrequent. The content associated with the broadcast tier may be transmitted indiscriminately in so far as it may be sent without regard to whether subscribers are actually viewing or requesting the associated content.

The multicasted tier, on the other hand, does not necessarily dedicate a particular channel to one content source or one type of content. The multicast tier dynamically constructions and deconstructions channels or multicast groups as a function of subscriber requests, subscriber viewing, bandwidth constraints, and the like. In this regard, the multicast tier discriminates content transmission in so far as content transmission requires identification of subscriber devices requesting the related transmission.

Content or programs carried on the multicast tier may be associated with a multicast channel/group that remains active while the content is being transmitted. An address may be temporarily assigned to the group and used by a device 24 to locate the related content. The address may not be permanently assigned to the content source 12. As such, a user may not be able to repeatedly instruct the device 24 to locate multicast content at the same address since it is unlikely that the desired content will remain at the same address or that the same address will even remain valid. In some case, the multicast address and/or related transmission may only remain active while the associated content is active, i.e., if the content is a live sporting event, the related multicast transmission and address may cease once the sporting event ceases.

Because each multicast group/address and the content it carries dynamically changes over time, some dialogue may be required to identify content carried on the multicast tier as well as its location. In environments where one of the service providers 16, 18 provides or supports operation of the device 24, the device 24 may be pre-programmed to execute dialogue necessary to locate the desired content across various transmission mediums supported by that provider 16, 18 (some providers may support different platforms (wireless, wireline, etc.) or protocols). Because different providers 16, 18 support signal transmission according to different codecs, addressing methodologies, etc., these devices are unable to execute the dialogue necessary to locate the desired content on the networks 20, 22 associated with other providers 16, 18. One non-limiting aspect of the present invention contemplates the use of a transition manager 26 to monitor content transmissions and related information across different provider networks 16, 18. The transition manager 26 can support dialogue necessary to identify content carried over other networks 16, 18.

If the device 24 transitions between non-affiliated networks 16, 18 that rely on different codecs or if the networks 16, 18 rely on different addressing, messaging, or encrypting procedures, the manager 26 can be used to support the operational requirements needed to facilitate the transition. This may require the manager 26 to monitor content carried over broadcast and multicast tiers of multiple networks 16, 18 and to correlate relate information, such as information associated with content addressing, encryption, codecs, etc. used to support content transmission. The manager 26 may include a handover management application (not shown) that processes this information in a manner suitable to facilitate transitioning the device 24 between the non-affiliated networks 16, 18 without interrupting the accessed services.

FIG. 1 illustrates a transitioning scenario where the device 24 is transitioned from a first provider network 16 to a second provider network 18. This transition may occur while the user of the device 24 is watching a particular television program or accessing other content available over the network 16. Transitioning from one network 16 to another 18 can be problematic if the desired content is not easily found on the other network 18. This can lead to an interruption in service, and in some cases, especially with live, real-time, or non-on-demand transmissions, a lapse in viewing. In addition to simply locating the program on the other network 18, the device 24 must also process the related signals according to the transmission characteristics of the other network 18, which may be different than the last network 16.

The transition manager 26 may be configured in accordance with the present invention to support transitioning of the device 24 by providing related transitioning instructions. The transitioning instructions may specify addresses (multicast or broadcast), codec parameters, and other information that may be necessary to accessing the content on the other network 18. The instruction may be transmitted to the device 24 over either one of the networks 16, 18 or through some other medium. The instructions may be tailored and/or selected according to the capabilities of the device 24 and related operations that the device 24 must execute to access the other network 18.

Figure 2:
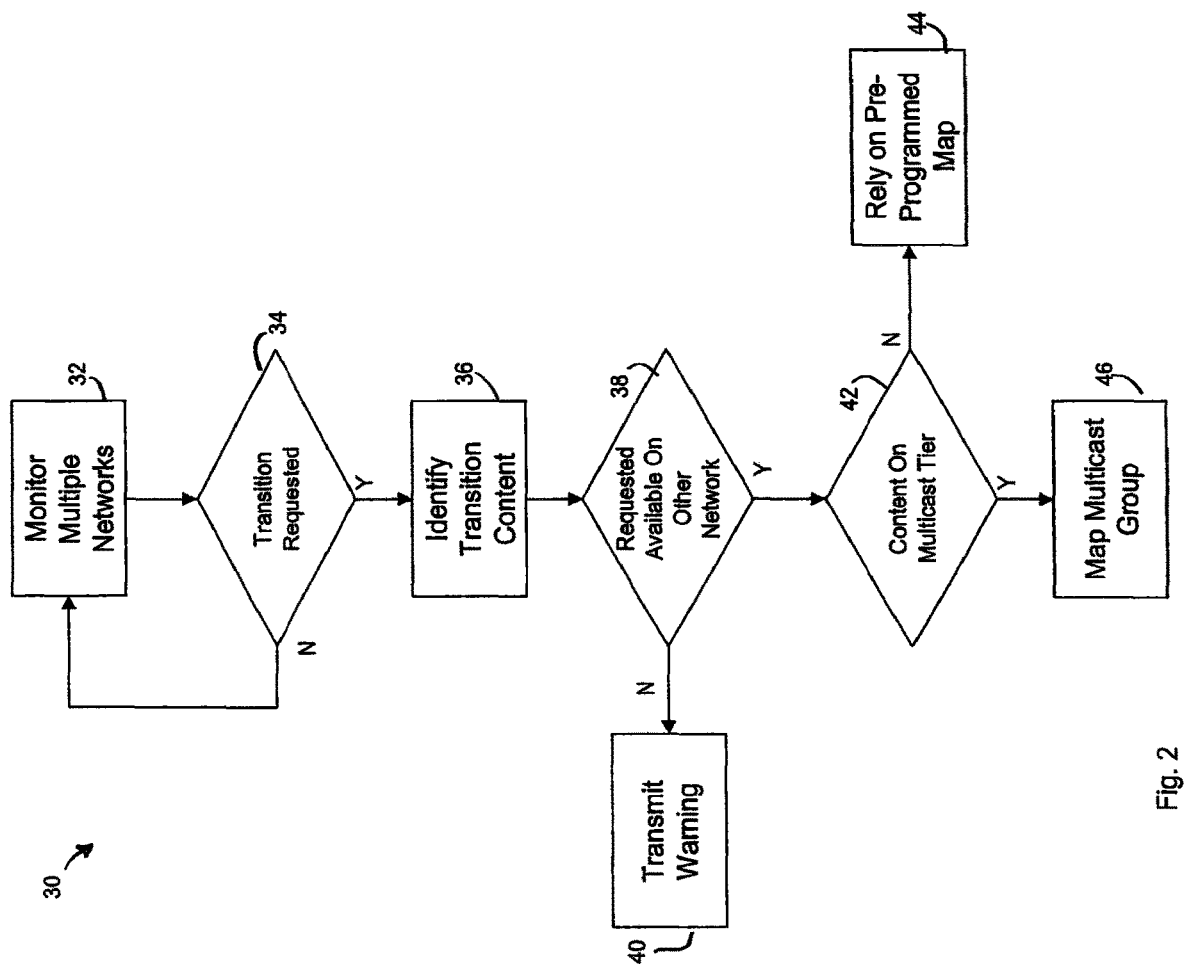
FIG. 2 illustrates a method of supporting seamless access to content in accordance with one non-limiting aspect of the present invention.

FIG. 2 illustrates a flowchart 30 method of supporting seamless access to content in accordance with one non-limiting aspect of the present invention. The method may be used to facilitate continuous subscriber access while a subscriber device accessing a particular piece of content transitions from one network to another. For exemplary, non-limiting purposes, the transition is explained with respect to the device moving from a first provider network to a second provider network where the second network transmits television signals differently than the first network, i.e., the first and second networks are heterogeneous.

Block 32 relates to monitoring content transmitted over the first and second networks. The transition manager and/or the first and second networks may be otherwise configured to monitor the content. The monitoring may include identifying, for each piece of content, the related broadcast or multicast channel (address), codec, encryption, etc. that is required to access the content. In some cases, the content may be accessed restricted to authorized subscribers, such as pay-per-view events, video conference, etc. Information necessary to accessing these signals may also be collected to facilitate transiting an authorized device.

Block 34 relates to determining a transition request. The transition request indicates a need or desire to for the subscriber or the subscriber device to maintain access to currently accessed content with reliance on another network to deliver the related signals, which in this example is the second network. The transition request may be subscriber initiated and/or automatically triggered. An interface may be provided on the device for the subscriber to request the transition or operating conditions of the device may be monitored to assess an automatic need for transition, such as but not limited to situations in which the device moves beyond an area supported by the first network and into an area supported by the second network.

Block 36 identifies the requested content. The related content may be identified by the subscriber and/or automatically from information associated with the operation of the device. The address currently used by the device to receive the content may be cross-reference with information collected above to identify the content, i.e., channel maps, source IDs, etc. can be cross-reference to content titles. The content may be identified in a manner that is generic to both of the first and second networks. This may include reliance on information transmitted with the content from the content source or other information that is commonly transmitted to each of the first and second networks and not subsequently manipulated by the networks.

Block 38 relates to assessing whether the identified content is also accessible on the second network. Even if the content is being transmitted over the second network, it may not be accessible if certain restrictions apply to its access. A warning may be transmitted in Block 40 if the content is not available or the device is otherwise unable to access it. Alternatively, a request may be sent to the second network requesting construction of a suitable transmission mechanism, such as but not limited to a new multicast/unicast group, on-demand session, or other exchange that would allow the device to receive the content even though the content was not previously transmitting over the second network.

The content being accessed by the subscriber may also influence the transition request and whether the content can be supported on the transitioned-to network. Some content may include geographical restraints or other access limitations that prevent access in certain areas. One example may relate to sporting event transmissions where some geographical areas may be authorized to access the event while others are not. If the transitioned-to network were to be in the non-authorized location, the transition may not be permissible. Another example may relate to user based limitations where content restrictions are placed on the user, as opposed to a geographic location of the device. The user based restrictions may prevent an identified user from access the content on another network if the user is not licensed or otherwise permitted to access the content over that network.

Block 42 relates to assessing whether content identified to be accessible on both of the first and second networks is transmitting on a broadcast or multicast tier. The broadcast tier relates to a relatively fixed set of broadcast channels, streams, groups, etc. that change infrequently. The consistency of the broadcast tier may allow for the use of static channel maps to relate the broadcast channels on one network with the related channels on the other network. This matching of channels, or content sources, can be pre-programmed or transmitted to the device in advance of receiving the transition request.

Block 44 relates to transitioning the device to the second network according to information pre-programmed into the device if the related content is carried over broadcast tiers on both of the first and second networks. This process may be essentially instantaneous and without interruption to the subscriber, such as by transitioning between images frames or during other suitable events where the user is unlikely to miss any important content. The relative permanency of the broadcast tier methodology can be helpful in easing administrative burdens associated with supporting the transition, such as eliminating the need to identify the content. Rather than identify the content showing on a particular channel, the transition can be a channel number to channel number transition where the device is transition simply as a function of the channel it is tuned to and not the content carried in the channel. On the other hand, some content may be not be broadcasted and some types of content may not be suited to broadcast tier based transmission.

These types of non-broadcast, or non-permanently addressed based communications, may broadly be considered and identified, at least for the purposes of the present invention, as multicast tier transmissions. The multicast transmissions contemplated by the present invention are not intended to be limited to IP related transmission or any other protocol specific transmission. The term is intended to have a broader meaning in that it covers any type of discriminating transmission where one or more members request the transmission, or are selected to be part of the transmission, and where the addressing, infrastructure, and other parameters used to support the multicast are dynamic and volatile.

Block 46 may be reached if the content identified for transition is multicasted. Rather than relying on the pre-programmed mapping information used in Block 44, Block 46 generates new transition instructions that map to the multicast group carrying the associated content. The new instruction may be generated and, optionally, after the request for transition is determined. Addressing, codec support, and other information necessary for the device to locate and process the content may be included in the instructions. At an appropriate period of time, the device may be instructed to switch networks without interruption to the subscriber, such as by transitioning between images frames or during other suitable events where the user is unlikely to miss any important content.

The device outputs the content from the second network as if it was still being received from the first network. From the subscriber's perspective, the transition may be seamless since the device is able to transition from one network to another without an interruption in service. If the transition were to take place proximate a boundary between the first and second networks where the device may need to repeatedly switch the networks, the instructions used to access the second network and the instructions used to access the first network, both of which are already on the device, may be used to support repeated transitions between the networks. This toggling may be accomplished without having to send new instructions or substantially repeat the instructions already on the device. This can be helpful in allowing continuous access while the device moves between edges of the networks.

The exemplary illustration provided above relates to a transitioning event where the subscriber device itself is transitioned from one network to another in the sense that it is transitions reliance on signal delivery from one network to another. The exemplary illustration is described with respect to transitions between different provider networks, such as but not limited to transitioning between a mobile phone network and a cable/satellite television network. This is only one example of the present invention. Similar transitions can occur within the same provider network, such as if the provider network supports multiple networks, such as a wireless network and a wireline network.

The present invention also is not intended to be limited to a device transitioning between networks. The present invention contemplates other applications, such as transitioning subscriber access between networks and devices. This type of transition can include a situation in which the user may desire continuous access to the content on another device. The user, for example, may begin watching a television program on a television and then desire access to the program on a mobile device. If the television is connected to a cable/satellite network and the mobile device is connected to a wireless network (WiFi, telecommunication, etc.), the transitioning requires activating the mobile device to access the content. This may include a similar process for locating the content on the second network as described above and an exchange or other event to trigger the mobile device to begin access the content.

The network transitions described above, whether the transitions relate to device transition or other types of transitions, are described with respect to locating content already being transmitted on the network to which the transition occurs. The present invention, however, is not necessarily limited to facilitate transitions where the content must be showing on the other network. The present invention fully contemplates constructing a transition medium, such as a switched digital channel, multicast, or broadcast of the desired on the new network if it is not already being transmitted. In this manner, as long as the new network can support transmission of the content, it can be request to begin transmitting the content if needed to support a transitioning event.

The examples described above related to the content being a television program, movie, or other media carried with signals referred to as television channels. This was done for exemplary purposes only and without intending to limit the scope and contemplation of the present invention. The present invention contemplates any means for identifying and carrying the signals, and not just television channels. Also, the present invention contemplates facilitating uninterrupted access to other types of content, such as but not limited to telephone calls, conference calls, video conferences, chat rooms, and other exchanges where a subscriber may require access to a stream of signals for some period of time.

As supported, various aspect of the present invention can related to: a multicast group manager that creates multicast groups based on content channel and access network codec (media) types; a multicast handover manager that takes in a number of inputs, including handset location, and instructs the handset client to join new multicast groups in order to present continuous content to the user without the need for user intervention; and a mobile handset client that communicates with the handover manager application to facilitate a transition. A handover application manager may interface to cellular location services to help enable the handover, or possibly filter content available to the subscriber based on location. It can also be provisioned with operator preferences on network selection given the content being distributed in case the mobile has a choice of multiple access networks in a single location.

Non-limiting aspects of the present invention define methods and apparatuses that support seamless service across access networks. In addition to supporting handover of multicast within a homogenous access network (same content on a new physical radio channel, but no change in codec or IP address), aspects of the present invention can support handovers across heterogeneous access networks (same content on a new access network and radio channel, new codec and potentially a new IP multicast group). If a user selects a channel of streamed multimedia on one access network, then moves to another, the invention can provide for the establishment of multicast on the new access network without the need for user intervention. The handover support may account for any one or any combination of the following aspects: mobile device location; operator managed network selection preferences; codec or media changes to accommodate the QoS capabilities of the access network; and/or changes in access network transport media, for example, from RTP on wireless networks to MEG transport on cable video networks.

Cellular phones and wireless personal devices are rapidly evolving to support a wide range of user services in a single mobile terminal. For example, they are becoming mobile debit cards, calendars, televisions, MP3 players, social network terminals in a addition to a basic voice telephone capability. The present invention can be used with these capabilities to provide an uninterrupted user experience of this wide range of service as the mobile device transitions a variety of access networks. One value to the customer may be a multi-purpose mobile device with continuous TV, internet, and voice services (similar to a cable subscription) regardless of the underlying access network.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a system having first and second heterogeneous networks that transmit content over broadcast tiers and multicast tiers, the broadcast tiers indiscriminately transmitting the content to a number of users and the multicast tiers discriminately transmitting the content to some number of users less than the number of users broadcasted content, a method that supports continuous access to multicasted content when a user transitions from the first to the second network, comprising:
   determining a number of multicast groups operating on the multicast tiers of the first and second networks;
   determining content being simultaneously multicasted on both of the first and second heterogeneous networks;
   identifying multicasted content being accessed by the user;
   if the identified content is being simultaneously multicasted over the second network, transmitting instructions that transition user access to the identified content from the first network according to a first codec of the first network, to the second network according to a second codec of the second network, the instructions including (i) information sufficient to locate the multicast group of the second network also identified to be multicasting the identified content, (ii) parameters of the second codec of the second network, and (iii) at least one address of the multicast group of the second network,
   wherein the first network is a wired network and the second network is a wireless mobile network.

2. The method of claim 1, further comprises identifying the identified content to correspond with content showing on a channel of the first network tuned to by a device that descrambles television signals.

3. The method of claim 1, further comprising identifying the need to transition user access to the identified content in response to receiving an out of range signal from a device accessing the identified content over the first network, the out of range signal indicating the device is approaching a boundary limit for receiving the identified content over the first network.

4. A method of supporting continuous access to content when access to the content is transitioned from a first network at a first codec to a second network at a second codec different from the first codec, the method comprising:
   identifying whether the content being accessed over the first network is also available over the second network;
   if the content is also available over the second network, identifying whether the content is available over a broadcast or multicast tier of the second network;
   if the content is available over the broadcast tier, generating transition instructions dependent on a static channel map used by the broadcast tier to instruct access to the content on the second network; and
   if the content is available over the multicast tier, generating transition instructions dependent on a current multicast group used by the multicast tier to instruct access to the content on the second network,
   wherein the transition instructions comprise parameters of the second codec of the second network and at least one multicast address of the second network, and
   wherein the first network is heterogeneous with respect to the second network.

5. The method of claim 4, further comprising preventing transmission of the transition instructions to a device used to access the content over the second network if the device is not authorized to access the content over the second network.

6. The method of claim 5, further comprising determining the device is not authorized to receive the content if transmission restraints on the content prevent the content from being accessed within a geographical area associated with the second network.

7. The method of claim 4, further comprising, if the static map is pre-loaded onto a device used to access the content, instructing the device to generate the transition instructions from the static channel map.

8. The method of claim 4, further comprising transmitting the transition instructions from a transition manager that tracks content available over the first and second networks.

9. The method of claim 8, further comprising the transition transmission of the content and including codec support instructions in the transmitted transition instructions.

10. The method of claim 4, further comprising transmitting the transition instructions to a device used to access the content over the first network and before the device begins receiving signals over the second network.

11. The method of claim 4, further comprising transmitting the transition instructions to support transitioning access from the first network being a wireline network to the second network being a wireless network.

12. The method of claim 4, further comprising transmitting the transition instructions to support transitioning of a mobile device from the wireline network being a cable television network to the wireless network being a wireless phone network.

\* \* \* \* \*